Jan. 16, 1962   G. BAECHLI   3,017,228
ROTARY SUPPORTING DEVICE
Filed Sept. 23, 1959

INVENTOR:
GEORGE BAECHLI

BY *E. Wallace Brewster*

ATTORNEY

United States Patent Office 3,017,228
Patented Jan. 16, 1962

3,017,228
ROTARY SUPPORTING DEVICE
George Baechli, New Philadelphia, Ohio, assignor to Joy Manufacturing Company, Pittsburgh, Pa., a corporation of Pennsylvania
Filed Sept. 23, 1959, Ser. No. 841,873
4 Claims. (Cl. 308—20)

This invention relates to rotary supporting devices and more particularly to idler rollers having a novel sealing and shock absorbing means on the supporting shaft thereof.

Conveyor belts in their present usage are supported for rolling movement on idler rollers of various designs a common one of which comprises a tubular steel idler roller supported for rotational movement by suitable anti-friction bearings mounted on a shaft extending centrally through the idler roller. Such anti-friction bearings include needle bearings, ball bearings, tapered bearings and other well known bearings suitable for such applications. It is also general practice to provide suitable sealing means on an idler roller adjacent the ends of the shaft to prevent the bearing lubricant from running over the ends thereof. With such an idler roller construction it is possible under adverse conditions to apply shock loads axially of the shaft which with the structures heretofore employed may either break the seal of the sealing means or cause misalignment of the bearings.

Therefore one object of this invention is to provide a new and improved rotary supporting device comprising an elongated idler roller having a novel sealing and shock absorbing means at each end thereof.

Another object of this invention is to provide a new and improved rotary supporting device comprising an elongated idler roller having anti-friction bearings and resilient rings mounted on the shaft adjacent the ends of the idler roller, respectively, and tubular spacer means located between the resilient rings and the bearings.

A specific object of this invention is to provide a new and improved rotary supporting device comprising an elongated idler roller having bearing supports with deformed resilient rings mounted on the shaft adjacent the ends of the idler roller with one end of the rings engaging the bearing supports and the other end engaging holding means mounted on the shaft, respectively, to provide shock absorbing means for axial forces.

Another specific object of this invention is to provide a new and improved rotary supporting device comprising an elongated idler roller having bearing supports with resilient rings mounted on the shaft adjacent the ends of the idler roller with one end of the rings having integral supporting means and engaging the bearing supports and the other end engaging holding means mounted on the shaft, respectively.

These and other objects of this invention will become apparent when taken in conjunction with the following description and detailed drawings of a preferred embodiment of this invention in which.

Figure 1:
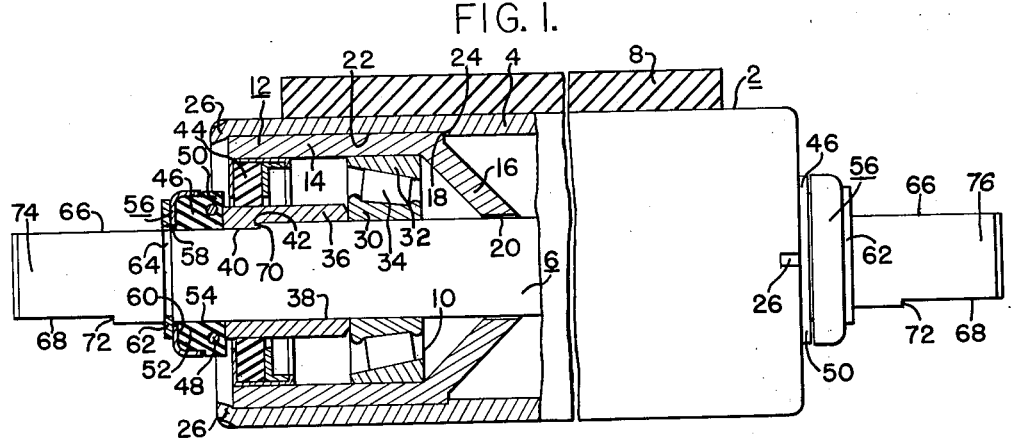
FIGURE 1 is a front elevational view of a rotary supporting device constructed in accordance with the principles of this invention with portions being broken away to more clearly illustrate the structure thereof.
Figure 2:
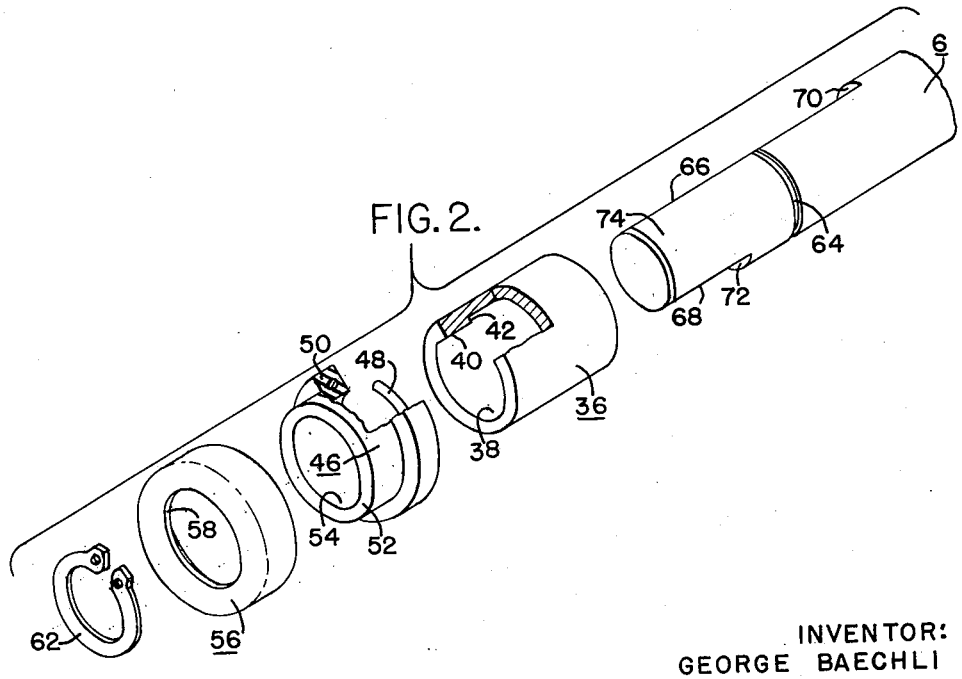
FIGURE 2 is an exploded perspective view of an end portion of the device as shown in FIGURE 1.

Referring to FIGURES 1 and 2 a rotary supporting device 2 constructed in accordance with the principles of this invention comprises an elongated tubular rotatable supporting member 4 having an elongated shaft 6 extending centrally therethrough and outwardly of each end thereof. The outer periphery of the tubular member 4 supports a belt 8 for rolling movement thereon so that the belt 8 can convey any suitable material over a surface and, accordingly, the belt supporting member 4 is supported for rotational movement on the shaft 6 by suitable bearing means such as by longitudinally spaced tapered roller bearings 10. Although for the purposes of this invention the bearings 10 can be suitably supported between the inner surface of the tubular member 4 and the shaft 6, as shown, the bearings 10 are located within elongated adapters 12 which extend coaxially inwardly of the tubular member 4 from the opposite ends thereof respectively.

Each adapter 12 comprises an elongated tubular portion 14 having a tapered portion 16 extending axially inwardly and outwardly from one end of the tubular portion 14. In order to facilitate the locating of the adapters 12, the tubular portions 14 are offset radially inwardly from the tapered portions 16 to provide a radially inwardly extending shoulder 18 around the periphery of each of the adapters 12. In addition each tapered portion 16 is provided with a central opening 20 which is of a size to permit the shaft 6 to pass freely therethrough. Although each adapter 12 may be suitably rigidly secured within the tubular member 4 in various well known manners as shown each end of the tubular member 4 is provided with an axially inwardly extending counterbore 22 having a radially extending shoulder 24 at the inner end thereof. With such construction the outer periphery of the tubular portions 14 of the adapters 12 are forced into the counterbores 22, respectively, so that the shoulders 18 engage the shoulders 24 with the outer ends of the tubular portion 14 being located axially inwardly of the outer ends of the tubular member 4, respectively. Thereafter, the outer ends of the tubular member 4 are bent or crimped inwardly into flange portions 26 which engage the outer end of the adapters 12 to prevent any axial outward movement of the adapters 12. In order that the adapters 12 are rigid with respect to the tubular member 4 a suitable press fit, as is well known in the art, is employed between the outer diameters of the tubular portion 14 and the counterbores 22.

As shown, each bearing 10 comprises an inner race 30 suitably secured on shaft 6 and an outer race 32 rigidly mounted within an adapter 12 with the races 30 and 32 being rotatably supported with respect to each other by suitable tapered rollers 34. For the purposes of this invention the inner diameter of the tubular portion 14 is of a suitable size to provide a press fit with the outer diameter of the races 32 and the outer diameter of the shaft 6 is of a size to provide a light press fit with the inner diameter of the races 30. With such well known press fits the bearings are suitably secured to the adapters 12 respectively and the shaft 6. In order to properly locate the bearings 10 the inwardly facing surfaces of the outer races 32 engage the outermost portion of the tapered portions 16 of the adapters 12, respectively.

For the purposes of this invention the outer surface of the inner races 30 are engaged by the inner ends of tubular spacer collars 36 which are slidably located on the portions of the shaft 6 outwardly adjacent the bearings 10, respectively. As more clearly shown in FIG. 2, each of the collars 36 is provided with an inner bore 38 having a flat land portion 40 at one side of one end thereof which extends chordally across the bore 38. The inner end of the flat land portion 40 provides a shoulder 42 which abuts against a shoulder 70 on shaft 6 as more fully described hereinafter.

The adapters 12 and the collars 36 may be constructed in any suitable manner, however, the adapters 12 and the collars 36 are preferably constructed of a sintered powdered metal which is readily molded into the desired described shape to a very close tolerance.

In order to prevent leakage of bearing lubricant from the open ends of the adapters 12 suitable tubular sealing elements 44 are located to extend between the outer surfaces of the collars 36 and the bores of the tubular portions 14 of the adapters 12, respectively. Sealing elements such as elements 44 are of well known construction and prevent lubricant from leaking from the bearing 10 between the sealing elements 44, the collars 36 and the adapters 12.

In order to prevent leakage of bearing lubricant along the shaft 6 a mass of deformable material such as tubular rings 46 are provided with inner end portions 50 which engage the outermost end surfaces of spacer collars 36, respectively. The rings 46 are made of any suitable resilient material such as molded rubber or neoprene and are provided with metal rings 48 adjacent the ends thereof engageable with the collars 36, respectively. The rings 48 are encased within the rings 46 during the molding process to strengthen the inner end portions 50 of the rings 46. The inner end portions 50 have end surfaces which engage the outer end surfaces of the collars 36. Extending outwardly from the inner end portions 50 are outer end portions 52 which are of a smaller diameter than that of the inner end portion 50. The rings 46 are also provided with an inner bore 54 which is of a size so as to be closely slidably received over the outer periphery of the shaft 6 before the rings 46 are deformed as hereinafter described.

Cup shaped retainer caps 56 which have circular openings 58 in the ends thereof are of a size to be closely freely received over the ends of the shaft 6. Engaging the outer surfaces of the retainer caps 56 are snap rings 62, respectively, which are received in shallow circular grooves 64 formed in the shaft 6 inwardly adjacent the ends thereof. When deformed the rings 46 assume the position as shown in FIG. 1 but before the rings 46 are deformed on the shaft 6 the outer end surfaces of the outer end portions 52 and the retainer caps 56 extend outwardly over the grooves 64 in the shaft 6, respectively. When the snap rings 62 are inserted in the grooves 64, the retainer caps 56 are forced inwardly along the outer periphery of the shaft 6 and flat land portions 66 therefore compress the rings 46 between the retainer caps 56 and spacers 36 mounted on the shaft 6. The retainer caps 56 are provided with inner end surfaces 60 which engage the end surfaces of the outer portions 52 of rings 46 respectively. The caps 56 force the deformed rings 46 against the outermost end surfaces of spacers 36 and in turn force the innermost end surfaces of the spacers 36 in tight engagement with the bearings 10. With such a construction the bearings 10 are held in a pre-loaded position by the spacers 36 through the compression effect of the deformed rings 46.

As shown, each end of the shaft 6 has diametrically opposed flat lands 66 and 68. The flat lands 66 and 68 extend longitudinally inwardly from the ends of the shaft 6, the lands 66 being longer in length than the lands 68. Each of the lands 66 terminate into a shoulder 70 on the shaft 6. The shoulders 70 provide stops for the spacer collars 36 at their respective shoulders 42. It will also be noted that shoulders 70 are located inwardly of the edges of the tubular member 4. The lands 68 have shoulders 72 on the shaft 6 to provide an appropriate stop for suitable mounting supports for the belt conveyor device 2 as is well known in the art. The end portions 74 and 76 immediately adjacent the ends of shaft 6 are so constructed so that they may be closely received in suitable mounting brackets (not shown) in order to provide proper support for the idler member 2 for operation thereof.

With such construction as described whenever an axial shock load is subjected on the shaft 6 the shock will be absorbed by the shaft 6 and the resilient rings 46 are deformed thus limiting the effect of any force in reaching the bearing 10. With such a construction the bearings 10 are protected from any shock forces expended through the shaft 6. The resilient rings 46 are held in deformation in between the snap rings 62 and spacer 36, the surfaces of the inner bore 54 of the rings 46 tightly engage the outer periphery of the shaft 6 and the flat lands 66 thus providing an efficient seal as well as a shock absorbing mass. With such a construction the resilient masses 46 not only take up any axial shock load subjected to the shaft 6 but also provide efficient sealing means for the shaft 6 and the bearings 10 spaced thereon.

Having described a preferred embodiment of this invention in accordance with the patent statutes, it is to be realized that modifications may be made without departing from the broad spirit and scope of the invention. Accordingly, it is respectfully requested that this invention be interpreted as broadly as possible and be limited only by the prior art.

What I claim is:

1. A rotary supporting device comprising, an elongated tubular member, an elongated shaft extending centrally through said tubular member, bearing means having one portion supported by said shaft and another portion supporting said tubular member, said bearing portions being movable relative to each other whereby said tubular member is rotatable about said shaft, a tubular deformable resilient ring mounted on said shaft with one end surface spaced from said one portion of said bearing, a tubular spacer slidably mounted on said shaft between said one portion of said bearing and said ring, and holding means mounted on said shaft and engageable with the other end surface of said ring to deform said ring whereby a fluid seal is obtained between said ring and said shaft and said ring absorbs loads applied axially of said shaft.

2. A rotary supporting device comprising, an elongated tubular member, an elongated shaft extending centrally through said tubular member, spaced bearing means each having one portion supported by said shaft and another portion supporting said tubular member, said bearing portions of each of said bearing means being movable relative to each other whereby said tubular member is rotatable about said shaft, tubular deformable resilient masses mounted on said shaft with end surfaces thereof spaced from said one portion of said bearings, respectively, tubular spacers slidably mounted on said shaft between said one portion of said bearings and said masses, and means mounted on said shaft and engageable with the other end surfaces of said masses, respectively, to deform said masses whereby a fluid seal is obtained between said masses and said shaft and said masses absorb loads applied axially of said shaft.

3. A rotary supporting device comprising, an elongated tubular member, an elongated shaft extending centrally through said tubular member, spaced bearing means each having one portion supported by said shaft and another portion supporting said tubular member, said bearing portions of each of said bearing means being movable relative to each other whereby said tubular member is rotatable about said shaft, tubular deformable resilient masses mounted on said shaft with end surfaces thereof spaced from said one portion of said bearings, respectively, tubular spacer means slidably mounted on said shaft in between said resilient masses and said one portion of said bearings, circular grooves in said shaft, spaced adjacent retainer caps engaging said other end of said resilient masses, holding means mounted in said grooves on said shaft engageable with the end surfaces of said retainer caps, and said holding means and retainer caps mounted on said shaft to deform said masses whereby a fluid seal is obtained between said masses and said shaft and said masses absorb loads applied axially of said shaft.

4. A rotary supporting device comprising, an elongated tubular member, an elongated shaft extending centrally through said tubular member, spaced bearing means each having one portion supported by said shaft and another portion supporting said tubular member, said bearing portions of each of said bearing means being movable relative to each other whereby said tubular member is rotatable about said shaft, tubular deformable resilient masses mounted on said shaft with end surfaces thereof spaced from said one portion of said bearings, respectively, said resilient masses being of a molded material, said end surfaces supporting circular wire member molded therein, tubular spacer means slidably mounted on said shaft between said resilient masses and said one portion of said bearings, circular grooves in said shaft spaced adjacent retainer caps engaging said other end of said resilient masses, holding means mounted in said grooves on said shaft engageable with the end surfaces of said retainer caps, and said holding means and retainer caps mounted on said shaft to deform said masses whereby a fluid seal is obtained between said masses and said shaft and said masses absorb loads applied axially of said shaft.

References Cited in the file of this patent

UNITED STATES PATENTS

| | | |
|---|---|---|
| Re. 24,687 | Swanson | Aug. 18, 1959 |
| 2,161,003 | Berman | June 6, 1939 |
| 2,757,988 | Lecourbe | Aug. 7, 1956 |
| 2,779,639 | Bainbridge | Jan. 29, 1957 |